(12) United States Patent
Kerhuel

(10) Patent No.: US 9,641,274 B2
(45) Date of Patent: May 2, 2017

(54) SNR ESTIMATION FOR SOUNDING SIGNALS

(71) Applicant: Samuel Kerhuel, Villeneuve Tolosane (FR)

(72) Inventor: Samuel Kerhuel, Villeneuve Tolosane (FR)

(73) Assignee: NXP USA, INC., Austin, TX (US)

(*) Notice: Subject to any disclaimer, the term of this patent is extended or adjusted under 35 U.S.C. 154(b) by 121 days.

(21) Appl. No.: 14/714,818

(22) Filed: May 18, 2015

(65) Prior Publication Data

US 2016/0173248 A1     Jun. 16, 2016

(30) Foreign Application Priority Data

Dec. 16, 2014   (WO) ................. PCT/IB2014/003068

(51) Int. Cl.
 *H04J 13/00*  (2011.01)
 *H04L 1/20*   (2006.01)
 *H04L 25/02*  (2006.01)
 *H04L 27/26*  (2006.01)
 *H04L 5/00*   (2006.01)

(52) U.S. Cl.
 CPC ............ *H04J 13/0062* (2013.01); *H04L 1/20* (2013.01); *H04L 5/00* (2013.01); *H04L 25/022* (2013.01); *H04L 25/0226* (2013.01); *H04L 27/2647* (2013.01); *H04L 5/0026* (2013.01); *H04L 5/0048* (2013.01)

(58) Field of Classification Search
 CPC .... H04J 13/0059–13/0062; H04L 1/20; H04L 5/0048; H04L 25/022; H04L 25/0226; H04L 27/2647
 See application file for complete search history.

(56) References Cited

U.S. PATENT DOCUMENTS

| | | | | |
|---|---|---|---|---|
| 8,441,991 B2 * | 5/2013 | Papasakellariou | ...... | H04J 13/22 370/329 |
| 9,001,641 B2 * | 4/2015 | Bertrand | ............ | H04J 13/0062 370/210 |
| 9,462,560 B2 * | 10/2016 | Iwai | ....................... | H04B 1/713 |
| 2012/0182857 A1 | 7/2012 | Bertrand et al. | | |
| 2015/0236882 A1 * | 8/2015 | Bertrand | ............... | H04L 5/0048 370/329 |

OTHER PUBLICATIONS

Tian et al.; "SNR Estimation based on Sounding Reference Signal in LTE Uplink"; 2013 IEEE Conference on Signal Processing, Communication and Computing (ICSPCC); Aug. 5-8, 2013; pp. 1-5; IEEE.

Wang et al.; "A Novel Channel Estimation Algorithm for Sounding Reference Signal in LTE Uplink Transmission"; Proceedings of IEEE International Conference on Communications Technology and Applications (ICCTA '09); Aug. 5-8, 2013; pp. 412-415; IEEE.

* cited by examiner

*Primary Examiner* — Luat Phung
*Assistant Examiner* — Thomas R Cairns

(57) ABSTRACT

An OFDM receiving apparatus is provided for estimating a signal-to-noise ratio of a code-division multiplexed sounding signal transmitted over a wide channel of a wireless communication system. The apparatus separately determines the noise power level and the signal power associated with the sounding signal. Namely, the noise power level is determined in the frequency domain based on a noise covariance matrix. Further, the sounding signal's power level is determined, in the time domain, based on power delay profile of the wide channel over which the sounding signal has been transmitted.

15 Claims, 2 Drawing Sheets

… (1)

SNR ESTIMATION FOR SOUNDING SIGNALS

CROSS REFERENCE TO RELATED APPLICATION(S)

The present application claims priority to International Patent Application No. PCT/IB2014/003068, entitled "SNR ESTIMATION FOR SOUNDING SIGNALS," filed on Dec. 16, 2014, the entirety of which is herein incorporated by reference.

FIELD OF THE INVENTION

This invention relates to an OFDM receiving apparatus, a method and a computer program for SNR estimation of a sounding signal.

BACKGROUND OF THE INVENTION

Long Term Evolution (LTE) wireless networks use Orthogonal Frequency Division Multiple Access (OFDMA) and Single Carrier Frequency Division Multiple Access (SC-FDMA) access schemes for the downlink (DL) and uplink (UL), respectively. User Equipments (UEs) are time and frequency multiplexed on a physical uplink shared channel (PUSCH) and a physical uplink control channel (PUCCH), and time and frequency synchronization between UEs guarantees optimal intra-cell orthogonality. An important UL reference signal, the Sounding Reference Signal (SRS) is defined in support of frequency dependent scheduling, link adaptation, power control and UL synchronization maintenance, which are functions handled above the Physical Layer, mainly at layer 2. The foregoing functions need, among others, a signal to noise ratio (SNR) measurement which may be derived from the SRS. Indeed, SRS processing occurring at the Physical Layer is able to deliver to upper layers mainly three metrics estimated from the SRS: channel estimates (e.g. for Downlink Beamforming) and gains across the system bandwidth (e.g. for frequency selective scheduling), noise variance and timing offset (e.g. for Timing Advance control). SNR can be directly derived from the first two above metrics or can use additional interference estimates from other reference signals such as the Demodulation Reference Signal (DMRS). A SINR estimate is described in Document (1) US 20120182857 A1 "Sounding Reference Signal Processing for LTE", Pierre Bertrand; Anthony Ekpenyong.

However, the SNR method of document (1) determines the averaged received power of a UE from the channel estimates which are obtained in the frequency domain following Digital Fourier Transforms (DFT) processing. This situation is problematic where a plurality of SNR need be determined for associated plurality of UE's sounding signals. In fact, in that case, the method of document (1) needs one DFT processing per UE per receiving antenna. The foregoing requires a lot of processing power, memory footprint and bus load.

Therefore, it would be desirable to have a solution that would be able to calculate a SNR for a plurality of UE's sounding signals without having to use the last stage DFT processing which is proportional to the number of UEs.

SUMMARY OF THE INVENTION

The present invention provides an OFDM receiving apparatus, a method and a computer program for SNR estimation of a sounding signal, as described in the accompanying claims. Specific embodiments of the invention are set forth in the dependent claims. These and other aspects of the invention will be apparent from an elucidated with reference to the embodiments described hereinafter.

BRIEF DESCRIPTION OF THE DRAWINGS

Further details, aspects and embodiments of the proposed solution will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the proposed solution may for the most part, be composed of electronic components and circuits known to those skilled in the art, details will not be explained in any greater extent than that considered necessary for the understanding and appreciation of the underlying concepts of the subject application, in order not to obfuscate or distract from the teachings of the subject application.

For the sake of understanding of the subject application, the following detailed description will focus on the Sounding Reference Signal (SRS) used in LTE networks. However, persons skilled in the art of communication systems will readily appreciate that the proposed solution may also apply to sounding signals in other communication systems different from LTE networks, where those others communication systems and sounding signals exhibit the same characteristics as those described thereinafter.

Figure 1:
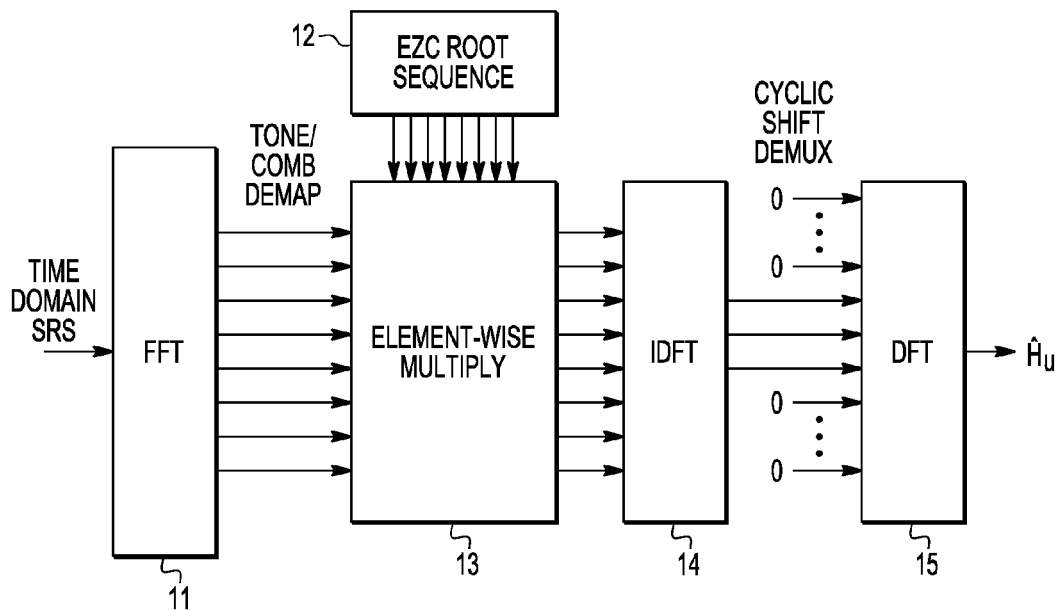
FIG. 1 is a schematic diagram of a conventional SRS receiver.

First, for the sake of clarity, it will be described the structure of the SRS in LTE networks. The skilled persons knows that the LTE frame, in the normal cyclic prefix configuration, is made of two sub-frames, each having six data symbols and one central pilot symbol (i.e. the DMRS: demodulation reference symbol). However, where a sub-frame is arranged for SRS transmission, the last symbol is reserved for the SRS. Multiple UEs can be multiplexed together in the same reserved sounding symbol thanks to a combination of Frequency Division Multiplexing (FDM) and Code Division Multiplexing (CDM). This concept is also known as frequency combing. Indeed, the SRS is built from a known code exhibiting constant-amplitude zero autocorrelation, CAZAC, property in the frequency domain. This property guarantees that discrete periodic autocorrelation are zero for all non-zero lags, allowing orthogonal code multiplexing by duplicating and cyclically shifting the known CAZAC sequence in the time domain or phase rotating in the frequency domain. In LTE networks, the SRS is built from an extended Zadoff-Chu (EZC) sequence constructed by extending the closest prime-length Zadoff-Chu (ZC) sequence to the SRS sequence length providing the arranged SRS bandwidth. The root ZC sequence from which SRS sequences are selected is the same as the one used for selecting DMRS. Hence, in a given sub-frame, multiple UEs in the same cell and with the same SRS bandwidth share the same EZC sequence defined in the frequency domain. Then, the root EZC sequence is modified to produce a cyclic shift in the time domain or a phase rotation in the frequency domain, for each UE, thus resulting in a CDM multiplexing of a plurality of UESs in a sounding symbol. In LTE networks, up to eight UEs share the same comb and up to four combs share the same sounding symbol. Thereinafter, it will be considered that a SRS comprises one sounding symbol multiplexing SRS of a first and a second UE. However, the skilled person should understand that the teaching of the subject applies to configurations where more than two UEs are multiplexed in the sounding symbol. Secondly, it will be described how a transmitted SRS is received by a conventional SRS receiver such as the receiver 10 of document (1) as illustrated in FIG. 1. The SRS receiver 10 comprises a Fast Fourier Transform unit 11, which converts received time sample sequence of a time-domain SRS comprising the SRS symbol, from the time domain to the frequency domain through an $N_{FFT}$-length FFT, thereby generating a frequency-domain SRS, wherein $N_{FFT}$ is the total amount of sub-carriers of the system bandwidth. Further, an EZC root sequence unit 12 generates a root sequence corresponding to the root sequence used in the generation of the SRS at the transmitter level. Furthermore, an element-wise multiply unit 13 multiplies the frequency-domain SRS with the complex conjugate of the expected root sequence obtained from the EZC root sequence unit 12. This performs a group-UE cyclic shift de-multiplexing, thereby generating a group-UE frequency-domain SRS comprising all CDM UEs multiplexed on the same root sequence. Later, an Inverse Fast Fourier Transform 14 unit converts the group-UE frequency-domain SRS from the frequency domain to the time domain sequence through $N_{SRS}$-length IDFT, where $N_{SRS}$ is the length of the EZC root sequence, thereby generating a group-UE time-domain SRS. Then, cyclic demultiplexing is performed by selecting, for each UE, the relevant samples of the group-UE time-domain SRS. This performs cyclic-shift de-multiplexing for each of the CDM users. Finally, a Fast Fourier Transform 15 converts each UE's relevant samples from the time domain to frequency-domain through $N_{SRS}$-length DFT, thereby generating corresponding frequency-domain channel estimates Ĥu. In order to estimate SNR for a given SRS user u, in document (1), it is made use of the corresponding channel estimates Ĥu, average received power and a noise variance of the sub-carriers samples. The noise variance is estimated, in the time domain, from areas of a concatenated power delay profile (PDP) of the channel over which the SRS has been transmitted, where no signal energy is present. The averaged received power is determined, in the frequency domain, from the channel estimates. Finally, the SNR is obtained by dividing the averaged received power by the noise variance.

To summarise, from the foregoing it can be readily appreciated that determining SNR for a plurality of UEs based on their associated SRS requires using a last stage DFT processing which is proportional to the number of UEs, i.e. a DFT processing is required for each UE per receiving antenna, in order to obtain the channel estimates Ĥu. As already stated above, the foregoing requires a lot of processing power for the computation of each DFT and also unduly uses memory footprint and bus load.

In order to solve the above-mentioned problem, it is proposed to calculate a plurality of SNR for associated plurality of UEs based on their respective SRS, without having to use the last stage DFT processing. To that end, noise power level and UE's signal power level are calculated separately. The noise power level is determined, in the frequency domain, from a noise and interference covariance matrix and UE's signal power level is determined, in the time domain, from a power delay profile of the channel over which the SRS has been transmitted.

Figure 2:
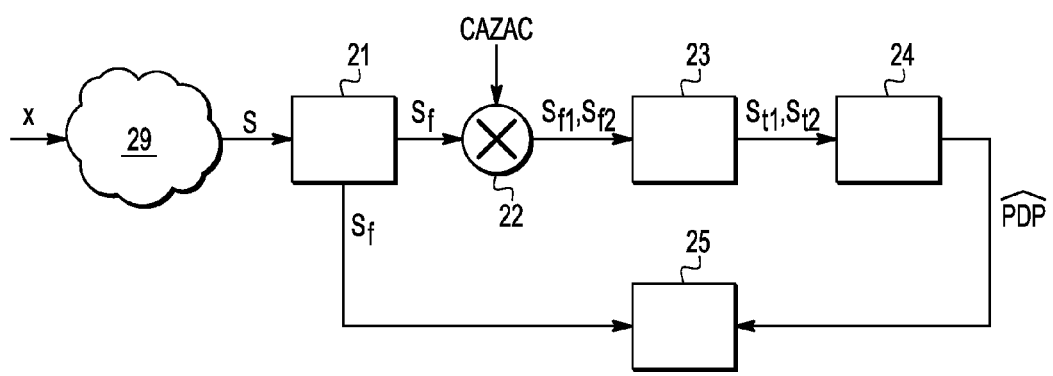
FIG. 2 is an exemplary wireless reception chain comprising a receiving apparatus according to embodiments of the subject application.

Referring now to FIG. 2, there is diagrammatically shown therein an exemplary OFDM receiving apparatus 20 in accordance with embodiments of the subject application. In FIG. 2, the receiving apparatus comprises:

a receiving unit such as a Radio Frequency (RF) receiver 21 similar to those normally encountered in OFDM communication systems, arranged to receive a sounding signal S transmitted over a wide channel 29 of a wireless communication system. The wide channel 29 may have a bandwidth such as 6 MHz, 10 MHz, 20 MHz or 40 MHz. The receiving unit 21 is further arranged to convert a received sounding signal into a frequency domain signal;

a complex multiplying unit 22 arranged to perform a complex multiplication in the frequency domain, on the basis of a frequency-domain signal and a complex conjugate of a known CAZAC code, thereby generating a phase rotated frequency-domain signal;

an Inverse Fast Fourier Transform (IFFT) unit 23 arranged to transform a phase rotated frequency-domain signal from the frequency domain to the time domain, thereby generating a cyclically shifted time-domain signal;

a power delay profile (PDP) estimation unit 24 arranged to estimate a power delay profile of the wide channel 29 based on at least a cyclically shifted time-domain signal, thereby generating a power delay profile estimate comprising at least a first energy region corresponding to a first propagation delay occurring in the wide channel 29; and, a processing unit such as a processor 25.

In FIG. 2, the receiving unit 21 is operably coupled to the complex multiplying unit 22, the latter being operably coupled to the IFFT unit 23. The IFFT unit 23 is operably coupled to the PDP estimation unit 24. The processing unit 25 is operably coupled to the receiving unit 21 and the PDP estimation unit 24. In embodiments, at least, the receiving unit 21 and the processing unit 25 are arranged to perform matrix operations over vectors and matrices.

In embodiments, the receiving unit 21 comprises:

a plurality of receiving antennas (not shown) arranged to receive one or more sounding signals;

a cyclic prefix removing unit (not shown) such as a signal processing unit, arranged to remove a cyclic prefix from symbol (s) of the received sounding signal; and, a Fast-Fourier Transform (FFT) and resource demapping unit (not shown) such as a FFT transformer, arranged to generate a received frequency-domain signal based on a sounding symbol of the received sounding signal with cyclic prefix removed.

In the example of FIG. 2, after a SRS x has passed through a wide communication channel 29, it is received, at the plurality of antennas of the receiving unit 21, a SRS S comprising one sounding symbol. As already explained above, the sounding symbol multiplexes SRS of a first and a second UE, thus enabling a plurality of SRS of respective UEs being transmitted at the same time. The receiving unit 21 generates a frequency-domain sounding signal $S_f$ based on received SRS S, wherein the index f stands for the frequency domain. In the example of FIG. 2, the frequency-domain sounding signal $S_f$ comprises first and second frequency-domain sounding signals associated with SRS of the first and second UE, respectively.

In embodiments, the complex multiplying unit 22 is similar to the element-wise multiply unit 13 of the conventional SRS receiver 10 of document (1) as described above and illustrated in FIG. 1. Namely, the complex multiplying unit 22 multiplies the frequency-domain SRS Sf with the complex conjugate of a known CAZAC code. The skilled person would readily appreciate that the known CAZAC code is the root sequence from which cyclic shifts or phase rotations are derived to enable multiplexing SRS of a first and a second UE in the sounding symbol. Therefore, the complex multiplying unit 22 performs a group-UE cyclic shift de-multiplexing, thereby generating a group-UE frequency-domain SRS comprising all CDM UEs multiplexed on the same root sequence. Since the frequency-domain sounding signal $S_f$ comprises first and second frequency-domain sounding signals, it results that the complex multiplying unit 22 generates a first phase rotated frequency-domain sounding signal $S_{f1}$ and a second phase rotated frequency-domain sounding signal $S_{f2}$, respectively.

In embodiments, the IFFT unit 23 transforms the first and second phase rotated frequency-domain sounding signal $S_{f1},S_{f2}$ from the frequency domain into the time domain, thereby generating first and second cyclically shifted time-domain sounding signals $S_{t1}$, $S_{t2}$, respectively, wherein the index t stands for the time domain. The skilled person would readily understand that the IFFT unit 23 may be replaced by an Inverse Discrete Fourier Transform (IDFT) unit without departing from the teachings of the subject application. This could be necessary, for instance, if the total amount of sub-carriers of the system bandwidth is not a power of two.

Figure 3:
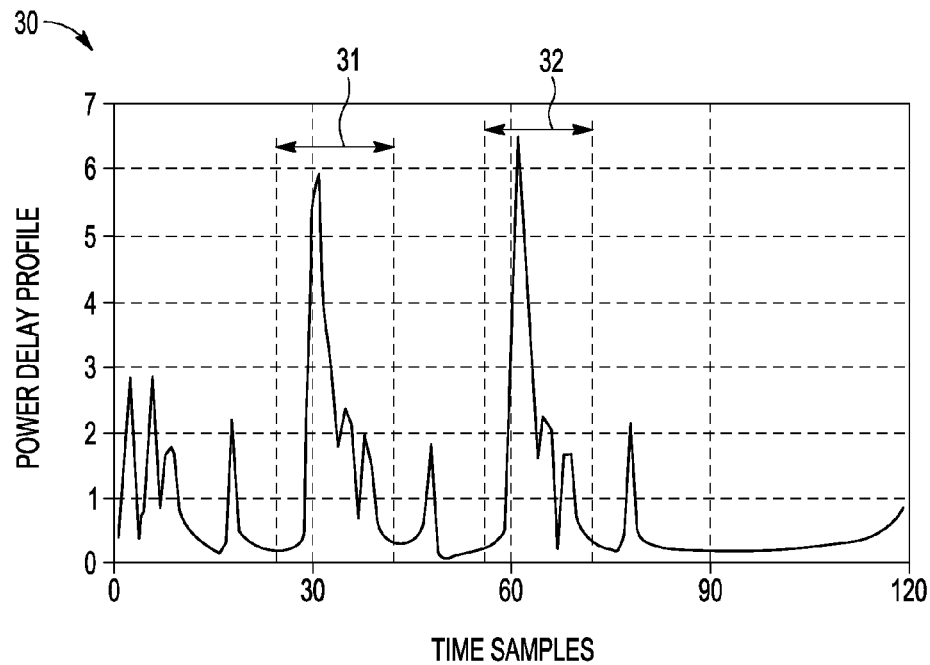
FIG. 3 is an exemplary power delay profile according to embodiments of the subject application.

In embodiments, the PDP estimation unit 24 generates a PDP estimate $\widehat{PDP}$ of the wide channel 29 based on the first and second cyclically shifted time-domain sounding signals $S_{t1},S_{t2}$ Namely, the $\widehat{PDP}$ is obtained by correlating each of the first and second cyclically shifted time-domain sounding signals $S_{t1},S_{t2}$ with an appropriately selected UE's cyclic shift of the known CAZAC code. In the case where the IFFT unit 23 is replaced by an IDFT unit, as already explained above, the $\widehat{PDP}$ can be obtained based on the amplitude of the power of two of each complex samples generated by the IDFT unit (i.e. i+jQ). Indeed, in this case, UE's propagation paths will show up as peaks in the $\widehat{PDP}$. The skilled person knows that the PDP illustrates the amount of energy collected at the receiving apparatus 20 and the delays associated with this reception. From the $\widehat{PDP}$, it can be derived parameters that are of use for characterizing the influence of the multipath fading on wireless channels. Such parameters may be the first moment of the $\widehat{PDP}$ (i.e. mean excess delay), the variance of the $\widehat{PDP}$ (i.e. the delay spread) and the significant paths that accumulate most of the energy of the multipath wide channel 29. In FIG. 3, there is shown a plot 30 of an exemplary PDP estimate $\widehat{PDP}$ versus time samples for the first and second UE wherein $\widehat{PDP}$ has been estimated by the PDP estimation unit 24. Namely, in FIG. 3, the horizontal axis indicates the time samples outputted by the IFFT unit 23 and the vertical axis indicates the power energy. In the example of FIG. 3, the plot 30 comprises a first energy region 31 and a second energy region 32 where most of the energy of the multipath wide channel 29 is accumulated for the first and second UE, respectively.

In embodiments, the processing unit 25 generates a noise and interference covariance matrix by producing a matrix representation of correlation between the signals received at the plurality of receiving antennas of the receiving unit 21, that are the first and second frequency-domain sounding signals associated with SRS of the first and second UE, respectively and which are comprised in the frequency-domain signal $S_f$, as already explained above. Namely, it is calculated the covariance matrix of a noise-and-interference signal. The noise-and-interference signal comprises at least noise component and an interference component derived from the frequency-domain signal $S_f$. Indeed, the processing unit 25 is further arranged to process the frequency-domain signal $S_f$ so as to identify the separate noise and/or interference components from other components. The noise-and-interference signal can be received on the one or more receiving antennas of the receiving unit 21 such that the noise-and-interference signal can include multiple sub-signals, each sub-signal corresponding to a single antenna. The noise and interference covariance matrix can be estimated using a number of suitable methods. In one embodiment, the noise and interference covariance matrix comprises diagonal elements which hold a combination of noise and interference power level received on each antennas of the receiving unit 21. Further, off-diagonal elements of the noise and interference covariance matrix comprise the interference power level received on all antennas of the receiving unit 21. The foregoing can be summarized by the following equation (2):

$$C_{i,j} = \sum_{s=1}^{p} N_{i,s} \times \overline{N_{j,s}}$$

wherein C is the covariance matrix, N is the noise, i and j are antennas indexes, s is the subcarrier index, p is the maximum of subcarrier in a resource element and $\overline{(\cdot)}$ is the conjugate operator.

An example of such noise and interference covariance matrix, for two receiving antennas of the receiving unit 21, is represented as follows (3):

$$C = \begin{bmatrix} A_1 \times \overline{A_1} & A_2 \times \overline{A_1} \\ A_1 \times \overline{A_2} & A_2 \times \overline{A_2} \end{bmatrix} = \begin{bmatrix} |A_1|^2 & A_2 \times \overline{A_1} \\ A_1 \times \overline{A_2} & |A_2|^2 \end{bmatrix}$$

Further, the processing unit 25 is arranged to determine a noise power level of the wide channel 29 based on the noise and interference covariance matrix. Namely, the noise power level is obtained by a subtraction operation between the diagonal elements and the off-diagonal elements, that is, between the combination of noise and interference and the interference power level. It can be readily noticed by the skilled person, that in the proposed subject application, the noise power level is determined in the frequency domain, as already explained above. The determination of the noise power level can therefore be performed before the processing of the SRS, so as to determine timing offsets for instance. The skilled person would also readily understand that in the proposed solution, the noise power level may be determined based on all subcarriers comprised in the wide channel 29, i.e. even on those not allocated to SRS, if it assumed that noise is constant across the bandwidth of the wide channel 29. In another embodiment, the noise power level may be determined based only on the SRS subcarriers comprised in the wide channel 29.

Further, the processing unit 25 is arranged to determine a first received power level associated with the first UE. Simulation results have shown that a rather good estimate of a UE's signal power, for an associated sounding signal, may be obtained by integrating samples of the associated energy region of the $\widehat{PDP}$. Hence, the processing unit 25 determines the first received power level associated with the first UE by integrating samples associated with the first energy region of the $\widehat{PDP}$. For instance, this could be done by summing a given number N of samples around the highest peak associated with the time samples comprised in the energy region. Of course, in that case, the skilled person could readily determine the number of time samples to be included in the first and second energy region depending on implementation needs. It can be readily noticed by the skilled person, that in the proposed subject application, the first received power level associated with the first UE is determined in the time domain since it is based on the $\widehat{PDP}$ which is determined in the time domain. Finally, the processing unit 25 is also arranged to determine the SNR associated with the first UE by dividing the first received power level by the noise power level.

In embodiments of the subject application, the processing unit 25 is further arranged to determine a second received power level associated with the second UE by integrating samples associated with the second energy region of the $\widehat{PDP}$, as already explained above. Further, the processing unit 25 is also arranged to determine the SNR associated with the second UE by dividing the second received power level by the noise power level. In another embodiment, the processing unit 25 is arranged to determine a first Signal to Interference-plus-Noise Ratio (SINR) of the first sounding signal by dividing the first received power level by a sum between the noise power level and the second received power level. In yet another embodiment, the processing unit 25 is arranged to determine a second SINR of the second sounding signal by dividing the second received power level by a sum between the noise power level and the first received power level.

Figure 4:
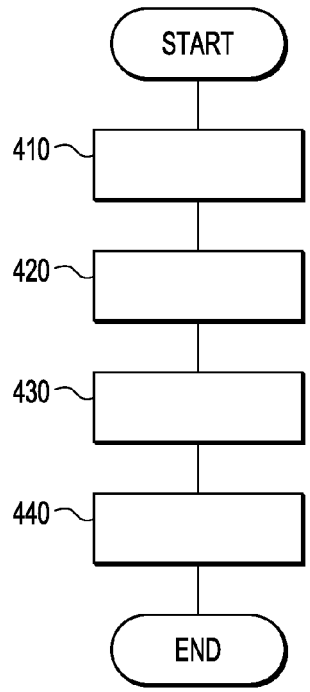
FIG. 4 is a schematic flow diagram of a method of SNR estimation according to an embodiment of the subject application.

Referring to FIG. 4, there is diagrammatically shown therein a schematic flow diagram of a method of estimating a SNR of a first sounding signal associated with a first user according to an embodiment of the subject application, wherein the first sounding signal is transmitted along with a second sounding signal associated with a second user, over a wide channel of a wireless communication system, the first and second sounding signals being code-division multiplexed in the frequency domain based on a phase rotated version of a known code exhibiting CAZAC, property.

In S410, it is received the first and second sounding signals, as already explained above with reference to the receiving unit 21. In S420, it is obtained in the frequency domain, a noise power level of the wide channel based on a matrix representation of correlation between the first and second sounding signals, as already explained above with reference to the processing unit 25. In S430, it is obtained in the time domain, a first received power level associated with the first UE based on a power delay profile estimate of the wide channel, as already explained above with reference to the complex multiplying unit 22, the IFFT unit 23, the PDP estimation unit 24 and the processing unit 25. Finally, in S440, it is obtained the SNR associated with the first user by dividing the first received power level by the noise power level.

It has now become clear that the proposed solution brings improvements over conventional SRS receiver such the receiver 10 of document (1) as illustrated in FIG. 1. Indeed, the proposed solution removes the need of a last DFT stage in order to determine the SNR of a sounding signal associated with a given user (i.e. UE). This is achieved by separately determining the noise power level and the signal power associated with the given user. Namely, the noise power level is determined in the frequency domain based on a noise covariance matrix. Further, the users signal power level is determined, in the time domain, based on power delay profile of the wide channel over which the users sounding signal has been transmitted. Based on the proposed solution, required processing power, memory footprint and bus load is reduced in comparison the conventional SRS receiver of document (1).

The above description elaborates embodiments of the subject application with regard to a SRS in LTE networks, using the wideband strategy where each comb spans over most the allocated bandwidth. However, without departing from the teaching of the subject application, other strategies such as the narrowband strategy can be used where each comb spans over a small chunk which vary in time to scan the entire allocated bandwidth. Of course, the above advantages are exemplary, and these or other advantages may be achieved by the proposed solution. Further, the skilled person will appreciate that not all advantages stated above are necessarily achieved by embodiments described herein. The proposed solution may also be implemented in a computer program product stored in a non-transitory computer-readable storage medium that stores computer-executable code which causes a processor computer to perform the operation of the receiving processing unit 25 and/or the exemplary method as illustrated in the foregoing description, for instance.

A computer program product is a list of instructions such as a particular application program and/or an operating system. The computer program may for example include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory unit storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, multipoint-to-point telecommunication equipment and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as an operation to users and programs of the system. The computer system may for example include at least one processing unit, associated memory unit and a number of input/output (I/O) devices. When executing the computer program, the computer system processes information according to the computer program and produces resultant output information via I/O devices.

In the foregoing specification, the proposed solution has been described with reference to specific examples of embodiments of the proposed solution. It will, however, be evident that various modifications and changes may be made therein without departing from the broader scope of the proposed solution as set forth in the appended claims. For instance, the determination of the noise and interference covariance matrix can be determined by a dedicated unit instead of being performed by the processing unit. In that case, the dedicated unit is operably coupled to the processing unit. Further, the determination of the UE's signal power level can be determined by a dedicated unit instead of being performed by the processing unit. In that case, the dedicated unit is operably coupled to the PDP unit and the processing unit. Still further, although the LTE radio communications system is described as an example in the foregoing exemplary embodiment, the present invention is not limited to LTE radio communications systems but also can be applied other radio communications systems that include a plurality of receiving antennas. In the foregoing description, it has been considered that only two UE's sounding signals are transmitted over the wide channel. However, the teachings of the subject application can be contemplated for more than two users sounding signals being transmitted in the wide-channel, as already explained above.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, is to be understood that the architectures depicted herein are merely exemplary, and that in fact many other architectures may be implemented which achieve the same functionality.

Any arrangement of devices to achieve the same functionality is effectively "associated" such that the desired functionality is achieved. Hence, any two devices herein combined to achieve a particular functionality may be seen as "associated with" each other such that the desired functionality is achieved, irrespective of architectures or intermediate devices. Likewise, any two devices so associated can also be viewed as being "operably connected," or "operably coupled," to each other to achieve the desired functionality. Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple examples of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the proposed solution is not limited to physical devices or units implemented in nonprogrammable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or operations then those listed in a claim. Furthermore, the terms "a" or "an," as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An OFDM receiving apparatus for estimating a Signal to Noise Ratio, SNR, of a first sounding signal associated with a first user, the first sounding signal being transmitted along with a second sounding signal associated with a second user, over a wide channel of a wireless communication system, the first and second sounding signals being code-division multiplexed in the frequency domain based on a phase rotated version of a known code exhibiting constant-amplitude zero autocorrelation, CAZAC, property, the receiving apparatus comprising:

a receiving unit comprising a plurality of antennas and arranged to receive and convert the first and second sounding transmission signals into first and second frequency-domain sounding signals, respectively;

a complex multiplying unit operably coupled to the receiving unit and arranged to multiply, in the frequency domain, the first and second frequency-domain sounding signals with a complex conjugate of the known CAZAC code, thereby generating first and second phase rotated frequency-domain sounding signals, respectively;

an Inverse Fast Fourier Transform, IFFT, unit operably coupled to the multiplying unit and arranged to transform the first and second phase rotated frequency-domain sounding signals from the frequency domain to the time domain, thereby generating first and second cyclically shifted time-domain sounding signals;

a power delay profile, PDP, estimation unit operably coupled to the IFFT unit and arranged to estimate a power delay profile of the wide channel based on the first and second cyclically shifted time-domain sounding signals, thereby generating a power delay profile estimate comprising first and second energy regions associated with first and second propagation delays occurring in the wide channel, respectively; and, a processing unit such as a processor, operably coupled to the receiving unit and the PDP estimation unit, the processing unit being arranged to:

produce a matrix representation of correlation between the first and second frequency-domain sounding signals received at the plurality of antennas, thereby generating a noise and interference covariance matrix;

determine a noise power level of the wide channel based on the noise and interference covariance matrix;

determine a first received power level by integrating samples associated with the first energy region; and, determine the SNR of the first sounding signal by dividing the first received power level by the noise power level.

2. The receiving apparatus of claim 1, wherein the processor is further arranged to:

determine a second received power level by integrating samples associated with the second energy region.

3. The receiving apparatus of claim 2, wherein the processor is further arranged to:

determine a first Signal to Interference-plus-Noise Ratio, SINR, of the first sounding signal by dividing the first received power level by a sum between the noise power level and the second received power level.

4. The receiving apparatus of claim 2, wherein the processor is further arranged to:

determine a second Signal to Interference-plus-Noise Ratio, SINR, of the second sounding signal by dividing the second received power level by a sum between the noise power level and the first received power level.

5. The receiving apparatus of claim 1 wherein the processor determines the first and/or second received power level by summing a given number N of samples around the highest power level of the respective energy region.

6. The receiving apparatus of claim 1, wherein, the communication system is a Long Term Evolution, LTE, communication system; and, the first and/or second sounding signal are sounding reference signals, SRS.

7. The receiving apparatus of claim 6, wherein the CAZAC code is a Zadoff-Chu sequence.

8. A method of estimating a Signal to Noise Ratio, SNR, of a first sounding signal associated with a first user, the first sounding signal being transmitted along with a second sounding signal associated with a second user, over a wide channel of a wireless communication system, the first and second sounding signals being code-division multiplexed in the frequency domain based on a phase rotated version of a known code exhibiting constant-amplitude zero autocorrelation, CAZAC, property, the method comprising:

receiving at a plurality of antennas and converting the first and second sounding transmission signals into first and second frequency-domain sounding signals, respectively;

performing a complex multiplication, in the frequency domain, between the first and second frequency-domain sounding signals and a complex conjugate of the known CAZAC code, thereby generating first and second phase rotated frequency-domain sounding signals, respectively;

transforming the first and second phase rotated frequency-domain sounding signals from the frequency domain to the time domain, thereby generating first and second cyclically shifted time-domain sounding signals;

estimating a power delay profile of the wide channel based on the first and second cyclically shifted time-domain sounding signals, thereby generating a power delay profile estimate comprising first and second energy regions associated with first and second propagation delays occurring in the wide channel, respectively;

producing a matrix representation of correlation between the first and second frequency-domain sounding signals received at the plurality of antennas, thereby generating a noise and interference covariance matrix;

determining a noise power level of the wide channel based on the noise and interference covariance matrix;

determining a first received power level by integrating samples associated with the first energy region; and, determining the SNR of the first sounding signal by dividing the first received power level by the noise power level.

9. The method of claim 8, further comprising:

determining a second received power level by integrating samples associated with the second energy region.

10. The method of claim 9, further comprising:

determining a first Signal to Interference-plus-Noise Ratio, SINR, of the first sounding signal by dividing the first received power level by a sum between the noise power level and the second received power level.

11. The method of claim 9, further comprising:

determining a second Signal to Interference-plus-Noise Ratio, SINR, of the second sounding signal by dividing the second received power level by a sum between the noise power level and the first received power level.

12. The method of claim 8 further comprising:

determining the first and/or second received power level by summing a given number N of samples around the highest power level of the respective energy region.

13. The method of claim 8, wherein, the communication system is a Long Term Evolution, LTE, communication system; and, the first and/or second sounding signal are sounding reference signals, SRS.

14. The method of claim 13, wherein the CAZAC code is a Zadoff-Chu sequence.

15. A computer program product stored in a non-transitory computer-readable storage medium that stores computer-executable code for estimating a SNR of a first sounding signal associated with a first user according, wherein the first sounding signal is transmitted along with a second sounding signal associated with a second user, over a wide channel of a wireless communication system, the first and second sounding signals being code-division multiplexed in the frequency domain based on a phase rotated version of a known code exhibiting CAZAC, property, the computer-executable process causing a processor computer to perform the method according to claim 8.

* * * * *